(12) United States Patent
Albert et al.

(10) Patent No.: US 8,650,127 B1
(45) Date of Patent: Feb. 11, 2014

(54) DIGITAL RIGHTS MANAGEMENT FOR COMPUTER PROGRAM CODE

(75) Inventors: Eric Albert, Santa Clara, CA (US); Michael Culbert, Monte Sereno, CA (US); Simon Patience, Los Gatos, CA (US); Michael Smith, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1570 days.

(21) Appl. No.: 11/327,778

(22) Filed: Jan. 6, 2006

(51) Int. Cl.
*G06Q 99/00* (2006.01)

(52) U.S. Cl.
USPC .............. 705/51; 705/57; 713/164; 713/189; 713/190

(58) Field of Classification Search
USPC ................. 705/50–51, 57; 713/164, 189, 190
See application file for complete search history.

(56) References Cited

U.S. PATENT DOCUMENTS

| | | | | |
|---|---|---|---|---|
| 5,091,938 A * | 2/1992 | Thompson et al. | ........... | 380/239 |
| 6,141,698 A * | 10/2000 | Krishnan et al. | .............. | 719/331 |
| 6,272,636 B1 * | 8/2001 | Neville et al. | ................. | 713/189 |
| 6,405,316 B1 * | 6/2002 | Krishnan et al. | .............. | 713/190 |
| 6,598,161 B1 * | 7/2003 | Kluttz et al. | .................. | 713/166 |
| 6,678,833 B1 * | 1/2004 | Grawrock | ..................... | 713/401 |
| 6,836,888 B1 * | 12/2004 | Basu et al. | ...................... | 718/104 |
| 6,934,817 B2 * | 8/2005 | Ellison et al. | ................. | 711/153 |
| 7,308,717 B2 * | 12/2007 | Koved et al. | .................... | 726/27 |
| 7,398,389 B2 * | 7/2008 | Teal et al. | ...................... | 713/164 |
| 2002/0092003 A1 * | 7/2002 | Calder et al. | ................... | 717/138 |
| 2002/0161996 A1 * | 10/2002 | Koved et al. | .................. | 713/150 |
| 2003/0120935 A1 * | 6/2003 | Teal et al. | ...................... | 713/188 |
| 2003/0217275 A1 * | 11/2003 | Bentley et al. | ................ | 713/184 |
| 2004/0107237 A1 * | 6/2004 | Kashiwada | ................... | 709/200 |
| 2004/0196970 A1 * | 10/2004 | Cole | ................................. | 380/1 |
| 2007/0198857 A1 * | 8/2007 | Gidalov | ........................ | 713/193 |

* cited by examiner

*Primary Examiner* — James D Nigh
(74) *Attorney, Agent, or Firm* — Womble Carlyle Sandridge & Rice LLP

(57) ABSTRACT

A digital rights management ("DRM") system is described that seeks to restrict the use and execution of certain computer program code to those hardware systems or platforms authorized by the provider of the protected software. To this end, certain computer programs (or portions thereof) are provided to authorized users in an encrypted format. When a "protected" program is to be executed, it is retrieved and stored in its encrypted format in operating system memory where it is accessible to operating system level routines (e.g., a file read operation). It is also decrypted and placed in another memory such that only the process executing the protected program has ready access to it.

29 Claims, 4 Drawing Sheets

DIGITAL RIGHTS MANAGEMENT FOR COMPUTER PROGRAM CODE

BACKGROUND

The invention relates generally to the field of computer data processing and more particularly, but not by way of limitation, to digital rights management schemes and systems for computer program code.

Virtually any information that can be represented by words, numbers, graphics, audio or video information, or a system of commands and instructions (e.g., a computer program) can be put into an electronic or digital format. Such information is commonly referred to as "digital content." With the advent of digital networks such as the Internet, digital content may be easily copied, distributed and used by a large number of individuals at very little cost or inconvenience.

As with prior art print and publication technologies, digital content may be protected under copyright law. However, while copyright law provides individuals and businesses with certain rights to restrict the reproduction and distribution of their work (e.g., their digital content), it does not in and of itself prevent or restrict such unauthorized reproduction or distribution.

Digital rights management systems have been developed to enforce certain ownership rights in digital content. Illustrative legal rights include, but are not limited to, the right to access, to use and to distribute digital content such as computer program code. In accordance with the invention, techniques (methods, devices and systems) to restrict the unauthorized reproduction, use and distribution of computer program code are described.

SUMMARY

In one embodiment the invention provides a digital rights management method to restrict the use, reproduction and distribution of protected digital content. The method includes obtaining encrypted information (e.g., a page of computer program code) for a process executing on a first computer system, storing the encrypted information in a first memory generally accessible to an operating system executing on the first computer system, decrypting at least a portion of the encrypted information and storing the decrypted information in a second memory associated with the process and not generally accessible to operating system routines. The encrypted information may comprise all (i.e., program code and data) or only portions (e.g., program code or data) of an executable program. In one embodiment, the decryption key is obtained from a special purpose hardware device such as a configuration register in a system management device. In another embodiment, the decryption key may be obtained from a second computer system. In addition, decryption may be in accordance with standard symmetric or asymmetric techniques. Also described are techniques for circumventing the claimed digital rights management scheme.

DETAILED DESCRIPTION

New and useful methods, apparatus, systems and computer program products to protect against the unauthorized use of computer program code are described. The following descriptions are presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

Generally speaking, a digital rights management ("DRM") system in accordance with the invention is designed to restrict the use/execution of certain computer program code to those hardware systems or platforms authorized by the provider of the protected software. To this end, certain computer programs (or portions thereof) are provided to authorized users in an encrypted format. When a "protected" program is to be executed, it is retrieved, decrypted and placed in memory such that only the process executing the protected program has ready access to it.

Figure 1:
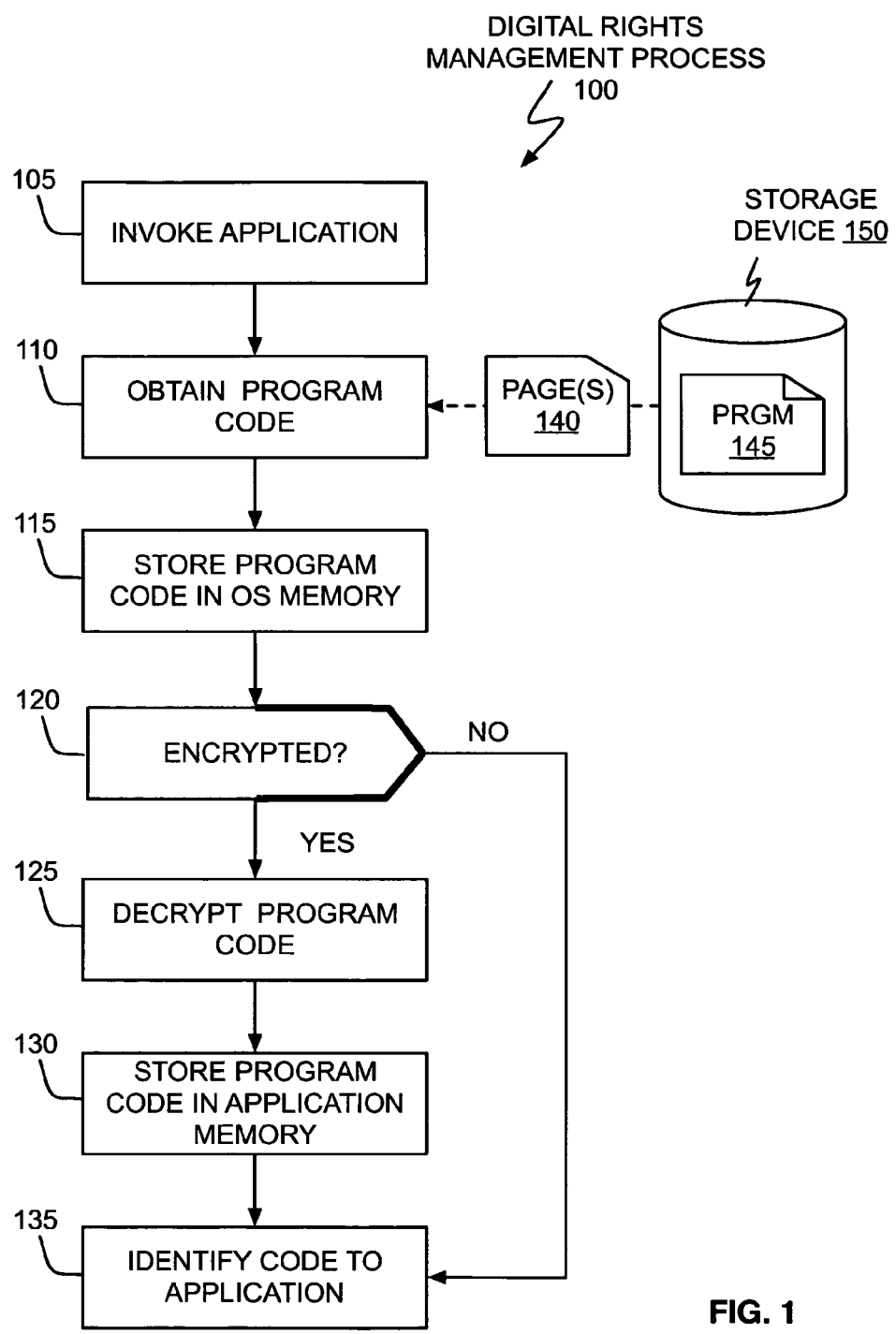
FIG. 1 shows, in flowchart form, a digital rights management process in accordance with one embodiment of the invention.

Referring to FIG. 1, digital rights management process 100 in accordance with one embodiment of the invention begins when an application is first invoked (block 105). Under operating system ("OS") control, program code associated with the targeted application is obtained (block 110) and placed into memory within the operating system's (e.g., kernel) memory space (block 115). For example, the "exec" subsystem of the Macintosh® operating system X ("Mac OS X") is that component of the OS responsible for obtaining program code (and associated data) from a storage device and placing it in system memory so that it may be executed. (MACINTOSH is a registered trademark of Apple Computer, Inc. of Cupertino, Calif.) Accordingly, in a Mac OS X system, the exec subsystem may place one or more pages 140 of application 145 (obtained from storage device 150) into a virtual memory buffer cache. Once loaded into OS memory in accordance with block 115, a test is made to determine if the program code is encrypted. In one embodiment, each page of information includes an indication of whether that page is encrypted. In another embodiment, the first page of an application's program code includes an indication as to whether the program code is encrypted. In yet another embodiment, a list is maintained by the OS (e.g., the exec subsystem) indicating which applications are encoded. In still another embodiment, the executable binary includes header information which may be used to indicate the associated program code has been encrypted. In Mac OS X systems, for example, executable files are stored as Mach-O binaries. Mach-O binaries include segment headers that can be used to identify which segments (if any) of the executable file are encrypted. If the program code is encrypted (the "Yes" prong of block 120), it is decrypted (block 125), stored in memory within the application's address space (block 130) whereafter the decrypted program code is identified to the application (block 135). If the program code is not encrypted (the "No" prong of block 120), the program code stored in OS designated memory in accordance with block 115 is identified to the application (block 135).

Figure 2:
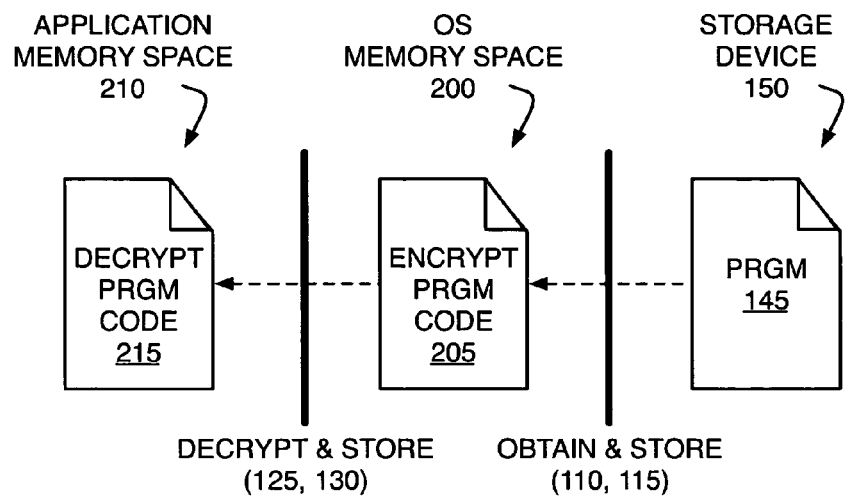
FIG. 2 shows, in schematic form, different memory spaces used by the digital rights management process of FIG. 1.

The operational distinction between acts in accordance with blocks 115 and 130 is shown schematically in FIG. 2. Specifically, some or all of encrypted target program 145 is obtained from storage device 150 and placed into OS memory space 200 in, for example, a virtual memory buffer cache. (It is noted that the content of encrypted program code 205 loaded into OS memory space 200 is substantially similar to the contents of the corresponding program code 145 retrieved from storage device 150.) In accordance with the acts of blocks 125 and 130, encrypted program code 205 is decrypted and stored into application memory space 210 as decrypted program code 215. It will be recognized that information stored in OS memory space 200 (e.g., encrypted program code 205) may be accessed by other OS routines such as, for example, a file READ routine. Because of this, if decrypted program code 215 were placed in OS memory space 200 it would be available to other applications. Thus, a second application could execute file READ operations against OS memory space 200 to obtain decrypted versions of the program code—thereby circumventing DRM process 100. In contrast, information stored in application memory space 210 is generally accessible only to the target application (e.g., through code injection techniques—see discussion below). Accordingly, attempts by third parties/other applications to access program 145 through standard OS routines (e.g., file READ operations) will simply return encrypted program code—205.

Figure 3:
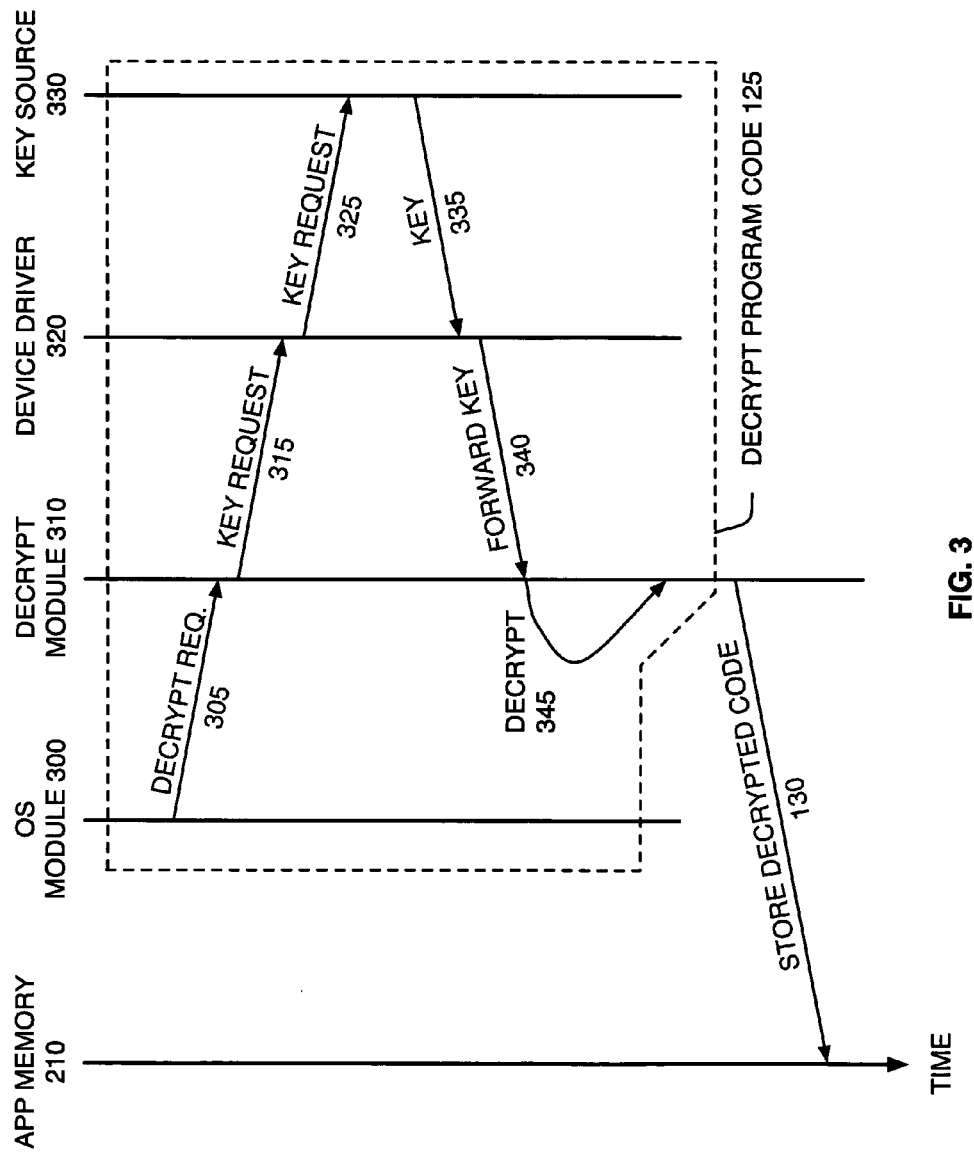
FIG. 3 shows program code decryption operations in accordance with one embodiment of the invention.

In one embodiment, DRM process 100 provides secure decryption of program code through the operations illustrated in FIG. 3 (see block 125 in FIG. 1). Initially, OS module 300 issues request 305 to decrypt one or more pages of encrypted program code (205) to decrypt module 310. In one embodiment, OS module 305 is that component of the operating system that loads program code 145 into memory 200—for example, the "exec" subsystem in Mac OS X. In this same embodiment, decrypt module 310 is a kernel extension that can: (1) obtain a decryption key from a secure source; (2) use the key to decrypt information provided or identified by OS module 305; and (3) store the decrypted information into application memory space 210. In the Mac OS X environment, kernel extensions ("KEXTs") are software modules that are dynamically loaded into, and execute within, the operating system's (i.e., kernel) memory space. For the MAC OS X operating system, KEXT structure and design principles are fully described in the "Kernel Programming Guide" and "I/O Kit Fundamentals" guide published and freely distributed by Apple Computer, Inc. (see http://developer.apple.com/documentation).

As shown, decrypt module 310 issues key request 315 to device driver 320. Device driver 320, in turn, issues key request 325 to key source 330. It will be recognized that a device driver is a software component designed to communicate with a hardware device. For the MAC OS X operating system, device driver design guidelines are published and freely distributed by Apple Computer, Inc. in the "I/O Kit Fundamentals" and "Introduction to I/O Kit Device Driver Design Guidelines" (see http://developer.apple.com/documentation). In one embodiment, key source 330 comprises a special purpose hardware support unit communicatively coupled to a computer system's central processing unit ("CPU") and, generally, configured as a slave processor thereto. One illustrative support unit, used by Apple Computer in its Intel-based computer systems, is based on the Renesas H8S/2000 series microcontrollers. It will be recognized that for device driver 320 to obtain a key from hardware-based key source 330, device driver 320 must know and implement a communication protocol that key source 330 supports. One of ordinary skill in the art will appreciate the precise nature of this protocol will depend upon the specific key source selected—the implementation of which would be within the ability of one of ordinary skill in the art. In another embodiment, key source 330 comprises a known memory location in storage. Such storage may, for example, reside in non-volatile memory in a common system component (e.g., configuration registers in a system control unit such as a north or south bridge circuit). Access to such storage will be in accordance with known techniques.

When requested in accordance with its communication protocol, key source 330 returns decryption key 335 to device driver 320 which, in turn, forwards the key 340 to decrypt module 310. Using the decryption key and a known decryption algorithm, decrypt module 310 decrypts 345 the program code provided (or identified) by OS module 300. The decrypted program code is then stored in application memory 210. In accordance with the operations outlined in FIG. 3, the decryption key obtained from key source 330 is not published to the operating system. In this way, the key is shielded from operating system routines that are designed to return OS memory contents.

Figure 4:
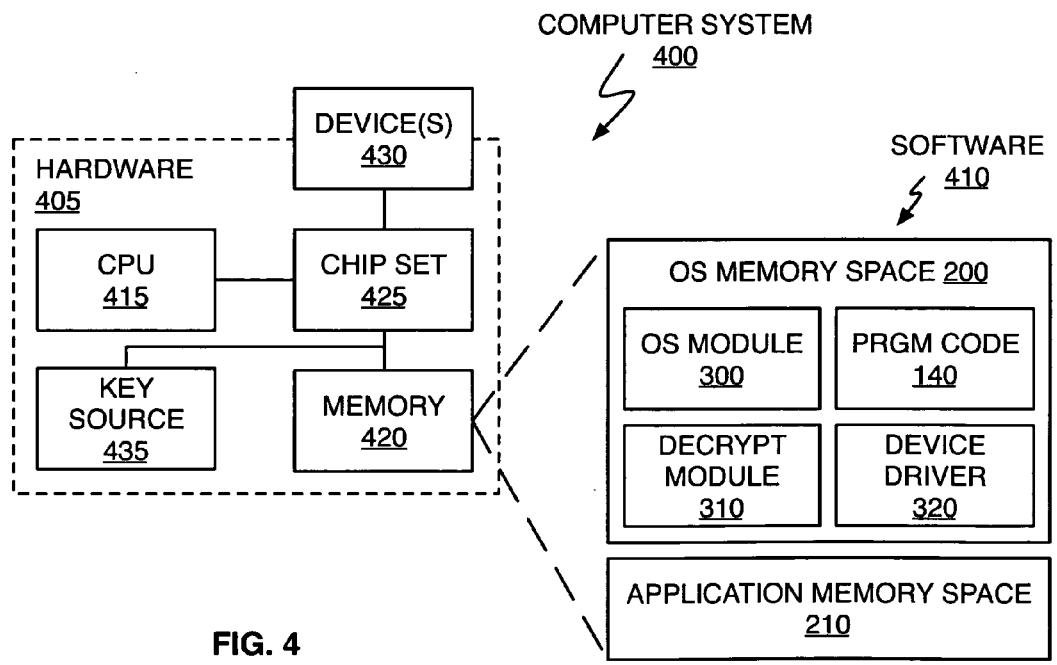
FIG. 4 shows, in block diagram form, a computer system suitable for implementing a digital rights management system in accordance with one embodiment of the invention.

Referring to FIG. 4, personal computer system 400 suitable for implementing DRM process 100, and as further illustrated in FIG. 3, includes hardware components 405 and software components 410. Hardware components include CPU 415 to execute program code/instructions, memory 420 to store computer program code and associated data, chip set 425 to mediate the transfer of information between and among the various hardware components, devices 430 such as audio, video and storage devices (internal and external) and key source 435. As shown, hardware memory component 420 may be used by both OS memory 200 and application memory 210.

In accordance with the invention, a decryption key is stored in key source 435 prior to computer system 400 being provided to a user and protected computer program code comprises operating system support applications. For example, in a computer system designed to run the Mac OS X operating system, illustrative protected computer programs/applications include, but are not limited to, the: dock application; system login window; system user-interface server; ATS server; Finder; disk image helper application; and mds (providing content indexing and query response). In one embodiment, only executable program code is encrypted (that is, data associated with an application is not encrypted). In another embodiment, both an application's executable program code and data are encrypted. In yet another embodiment, only some of an application's executable program code and/or data is encrypted. For example, every other page or block. In still another embodiment, the encryption key is broken into a plurality of sub-keys, where each sub-key is used to decrypt a portion of a page of encrypted information. For example, the key obtained from key source 330 may be broken into two sub-keys, where a first sub-key is used to decrypt the first portion of a page and the second sub-key is used to decrypt a second portion of a page.

DRM process 100 restricts the use of protected computer program code to those computer systems (e.g., computer system 400) that have had the appropriate decryption key stored therein (e.g., in key source 435). Unauthorized use, distribution and/or modification of protected computer programs may be had, for example, if: (1) decrypted versions of the protected computer program code or (2) the decryption key are obtained.

Figure 5:
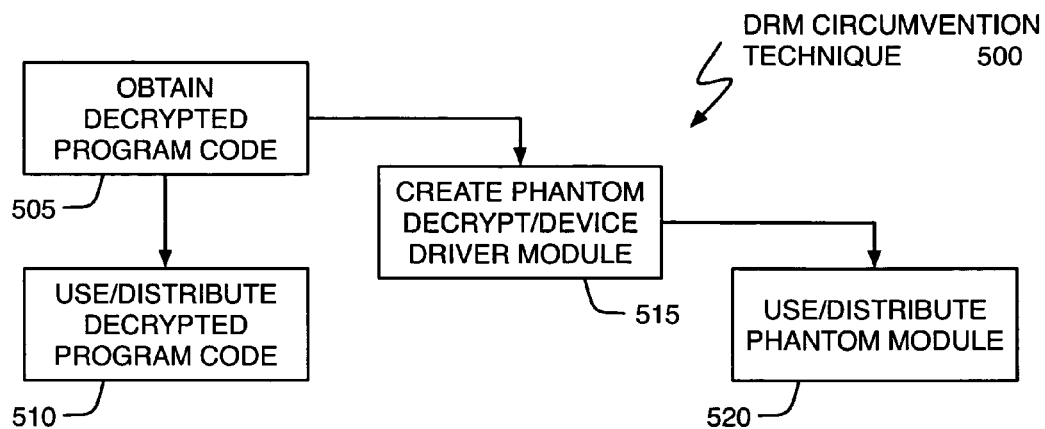
FIG. 5 shows, in flowchart form, one technique to circumvent a digital rights management scheme in accordance with the invention.

Referring to FIG. 5, for example, the use, distribution or modification of a protected application in accordance with circumvention technique 500 includes the unauthorized capture of decrypted computer program code (block 505) which may then be directly distributed (block 510) or used to generate a phantom version of decrypt module 310 or device driver 320 (block 515)—either one of which could then be distributed (block 520). It will be recognized that since DRM process 100 stores decrypted program code into an executing application's memory space (e.g., memory space 210), to obtain access to this content one must "snoop" the application's memory space. In general, this may be accomplished by injecting code into an application's memory space at runtime that then examines the application's memory space for the targeted decrypted code. One technique to accomplish this would be to create a library that could be linked or loaded to the target application at run-time (e.g., one of the applications identified above). Another technique, in a Mac OS X environment, is to write and install an input method that does the same "search and copy" actions as a library module. In this latter technique, the phantom decrypt module (e.g., 310) or device driver (e.g., 320) could incorporate (or have access to) decrypted versions of the heretofore protected computer program code—returning the decrypted versions of the program directly to the requesting processes memory space. That is, no decryption key would be used and no decryption operation would be performed at run-time. Alternatively, decrypted code obtained in accordance with block 510 could be used or distributed directly as a replacement for the "protected" program code (including, for example, associated program data). Library and input method technologies are fully described in the "Mac OS X Technology Overview" and "BasicInput-Method sample code" guides that are published and freely distributed by Apple Computer, Inc. (see http://developer.apple.com/documentation/).

Figure 6:
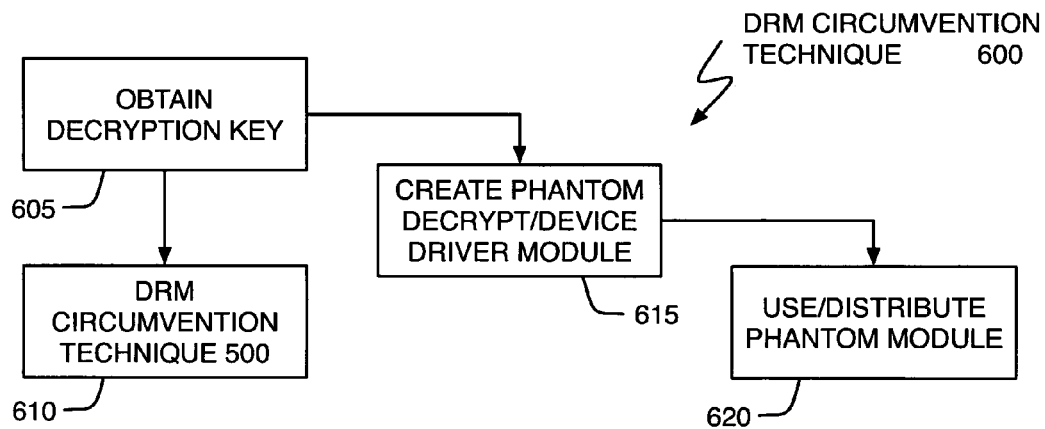
FIG. 6 shows, in flowchart form, another technique to circumvent a digital rights management scheme in accordance with the invention.

Another approach to circumventing DRM process 100 is shown in FIG. 6. Rather than obtaining and distributing unauthorized copies of protected computer program code directly (as described above with respect to FIG. 5), circumvention technique 600 relies on obtaining and using an unauthorized copy of the decryption key (block 605). One of ordinary skill in the art will appreciate that a decryption key for a system in accordance with, for example FIGS. 3 and 4, may be obtained by identifying decrypt module 310, device driver 320 and/or key source 330 and monitoring the communications between two or more of these modules during run-time operations on a computer system executing a protected program (that is, on an authorized platform or computer system). Once the decryption key associated with an authorized computer system is obtained (block 605), it may be used to generate decrypted versions of protected computer programs and used in accordance with FIG. 5 (block 610). Alternatively, knowledge of the decryption key may be captured within a phantom decrypt or device driver module (block 615). The phantom module could then be distributed to users of unauthorized computer systems (block 620)—the module itself performing the act of decryption during run-time operations (thereby circumventing the need for key source 330).

Figure 7:
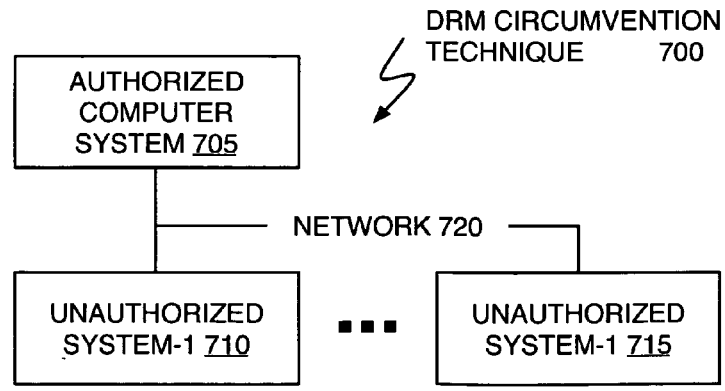
FIG. 7 shows, in flowchart form, still another technique to circumvent a digital rights management scheme in accordance with the invention.

Still another approach to circumventing DRM process 100 is shown in FIG. 7. Rather than obtaining and distributing unauthorized copies of protected computer program code (as described above with respect to FIGS. 5 and 6), circumvention technique 700 uses authorized computer system 705 to distribute decrypted code and/or the decryption key to one or more unauthorized computer systems 710-715 via communications network 720. As used herein, an "authorized" computer system is one that is authorized by a computer program's publisher or owner to execute the computer program. In this approach, unauthorized computer systems 710-715 have loaded thereon one or more computer applications that are encrypted in accordance with the invention. When invoked, such programs issue a key request (see, for example, FIG. 3). One or more software modules executing on the unauthorized systems capture such requests and route them to authorized computer system 705—accepting the returned key or decrypted computer program code. In this manner, the decryption key and/or decrypted program code is obtained in a manner using techniques that would, if used on computer system 705, would be authorized. However, because unauthorized computer systems 710-715 have not been authorized by the protected application's publisher/owner, such use is in violation of the publisher's/owner's right to restrict the use of same.

Various changes in the materials, components, as well as in the details of the illustrated operational methods are possible without departing from the scope of the following claims. For example, digital rights management process 100 does not have to request a key for each page or block of memory decrypted as suggested in FIG. 3. In one embodiment, a key request is made for each page of information decrypted. In another embodiment, however, a key request is made only at decrypt module or device driver initialization. In still another embodiment, a key request is made periodically. It will also be recognized that while the invention has been described in terms of decrypting "pages" of information, no such limitation is required. A "page" of memory is simply one convenient quantum of information—any other quantum may also be used (e.g., a byte, a word, a block, . . . ). Further, variable size quanta may be used in accordance with the described digital rights management methodologies. In addition, and as previously discussed, a decryption key in accordance with the invention may be retained in special purpose hardware (e.g., 330 or 435) that is unique to computer system platforms authorized to execute protected computer program code (e.g., 400) or a non-volatile storage associated with common or known computer system hardware (e.g., north or south bridge circuits used in modern personal computer systems). Further, acts in accordance with FIGS. 1, 3, 5 and 6 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine.

Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. A computer executed digital rights management method for computer program code, comprising:

obtaining an encrypted computer program code for a first application process running on a computer system;

storing the encrypted computer program code in a first memory that is accessible by an operating system program code and inaccessible by the first application process running on the computer system;

obtaining, by the operating system program code, a key associated with the encrypted computer program code;

decrypting, by the operating system program code, the encrypted computer program code using the key; and storing, by the operating system program code, the decrypted computer program code in a second memory accessible by the first application process and inaccessible by a second application process that is distinct from the first application process.

2. The digital rights management method of claim 1, further comprising executing the decrypted computer program code on the computer system.

3. The digital rights management method of claim 1, wherein the act of obtaining the key comprises obtaining the key from another computer system that is different from the computer system.

4. The digital rights management method of claim 3, wherein the act of obtaining the key from another computer system comprises using a communications network.

5. The digital rights management method of claim 4, further comprising executing the decrypted computer program.

6. The digital rights management method of claim 1, wherein the act of obtaining the key comprises obtaining the key from a special purpose hardware device.

7. The digital rights management method of claim 1, wherein the act of obtaining the key comprises obtaining the key from a hardware component that is physically associated with the computer system.

8. The digital rights management method of claim 1, wherein the act of obtaining the key comprises issuing a request to an operating system software module, and the operating system software module causes a request to be issued to a hardware component that causes the hardware component to return the key.

9. The digital rights management method of claim 1, wherein the key comprises a symmetric encryption key.

10. The digital rights management method of claim 1, wherein the act of decrypting comprises:
using a first predetermined portion of the key to decrypt a first portion of the encrypted computer program code; and
using a second predetermined portion of the key to decrypt a second portion of the encrypted computer program code.

11. The digital rights management method of claim 1, wherein the act of obtaining the key is performed once for each of an obtained quanta of the encrypted computer program code.

12. The digital rights management method of claim 1, wherein the act of obtaining the key is performed more than once for each of an obtained quanta of the encrypted computer program code.

13. The digital rights management method of claim 1, wherein the act of obtaining the key is performed at specified intervals.

14. The digital rights management method of claim 1, wherein the act of storing the encrypted computer program code comprises storing the encrypted computer program code in a first portion of a random access memory (RAM) of the computer system and the act of storing the decrypted computer program code comprises storing the decrypted computer program code in a second portion of the RAM.

15. The digital rights management method of claim 1, wherein the act of obtaining the encrypted computer program code is performed by the computer system.

16. A computer executed method, comprising:
obtaining, by an operating system process executing on a computer system, an encrypted computer program code for a first application process executing on a computer;
storing, by the operating system process, the encrypted computer program code in a first memory region accessible by the operating system process and inaccessible by the first application process;
providing the encrypted computer program code to an operating system decryption process executing on the computer system, wherein the operating system decryption process executes from the memory region accessible by the operating system process;
obtaining, by the operating system decryption process, a key for decrypting a first portion of the encrypted computer program code;
decrypting, by the operating system decryption process, the first portion of the encrypted computer program code using the key; and
storing, by the operating system decryption process, the decrypted first portion of the encrypted computer program code only in a second memory region accessible by the first application.

17. The method of claim 16, wherein the act of obtaining the key comprises obtaining the key from another computer system that is different from the computer system.

18. The method of claim 16, wherein the act of obtaining the key comprises obtaining the key from a special purpose hardware device.

19. The method of claim 16, wherein the act of obtaining the key comprises obtaining the key from a hardware component that is physically associated with the computer system.

20. The method of claim 16, wherein the act of obtaining the key is performed once for each of an obtained quanta of the encrypted computer program code.

21. The method of claim 16, wherein the act of obtaining the key is performed more than once for each of an obtained quanta of the encrypted computer program code.

22. The method of claim 16, wherein the act of obtaining the key is performed at specified intervals.

23. A computer executed digital rights management method for computer program code, comprising:
obtaining, by an operating system process executing on a computer system, program code for an application executing on the computer system;
determining, by the operating system process, that the obtained program code is encrypted;
issuing, by the operating system process, a request to decrypt the encrypted program code to an operating system decryption process;
providing, by the operating system process, the encrypted program code to the operating system decryption process;
requesting, by the operating system decryption process, a decryption key for decrypting the encrypted program code from a key source;
receiving, by the operating system decryption process, the decryption key from the key source;
decrypting, by the operating system decryption process, the encrypted program code using the decryption key; and storing, by the operating system decryption process, the decrypted program code into a memory space designated for use by a user-level application.

24. The computer executed digital rights management method of claim 23, wherein the act of obtaining the key comprises obtaining the key from another computer system that is different from the computer system.

25. The computer executed digital rights management method of claim 23, wherein the act of obtaining the key comprises obtaining the key from a special purpose hardware device.

26. The computer executed digital rights management method of claim 23, wherein the act of obtaining the key comprises obtaining the key from a hardware component that is physically associated with the computer system.

27. The computer executed digital rights management method of claim 23, wherein the act of obtaining the key is performed once for each of an obtained quanta of the encrypted computer program code.

28. The computer executed digital rights management method of claim 23, wherein the act of obtaining the key is performed more than once for each of an obtained quanta of the encrypted computer program code.

29. The computer executed digital rights management method of claim 23, wherein the act of obtaining the key is performed at specified intervals.

\* \* \* \* \*